United States Patent [19]
Walton et al.

[11] 3,893,961
[45] July 8, 1975

[54] TELEPHONE CABLE SPLICE CLOSURE FILLING COMPOSITION

[76] Inventors: Basil Vivian Edwin Walton, 54 Melrose Crescent; William Edward John Wannamaker, 121 Avondale Rd., both of Belleville, Ontario, Canada

[22] Filed: Jan. 7, 1974

[21] Appl. No.: 431,161

[52] U.S. Cl. .............. 260/23 H; 106/270; 106/271; 117/158; 174/25; 274/121; 260/285 A; 260/897 A
[51] Int. Cl. ........................ C08f 19/14; C08f 21/04
[58] Field of Search......... 260/23 H, 897 A, 28.5 A, 260/897 A, 41 R; 106/270, 271; 117/158; 114/25; 11/121

[56] References Cited
UNITED STATES PATENTS

| | | | |
|---|---|---|---|
| 2,339,958 | 1/1944 | Sparks | 260/897 A |
| 2,825,709 | 3/1958 | Sturm | 260/897 A |
| 3,156,666 | 11/1964 | Druett | 260/41 |
| 3,210,305 | 10/1965 | Coenen | 260/28.5 |
| 3,271,340 | 9/1966 | Shearer | 260/28.5 A |

OTHER PUBLICATIONS
Encyclopedia of Chemical Technology, Dec. 1953, pages 794 and 795.

*Primary Examiner*—Melvyn I. Marquis
*Assistant Examiner*—William E. Parker
*Attorney, Agent, or Firm*—Kenyon & Kenyon Reilly Carr & Chapin

[57] ABSTRACT

A composition suitable for use in filling splice closures in telephone cables is disclosed. The compositions comprises:

(a) from about 85% to about 98% by weight liquid polybutene, said polybutene having a viscosity within the range of 200 to about 1750 SUS/98.8°C., (b) from about 1% to about 10% by weight of polyethylene of molecular weight in the range of 10,000 – 20,000; and (c) from about 0.25% to about 6% by weight of a gelling agent selected from (i) hydrogenated castor oil and (ii) finely divided silica. The composition is a thixotropic, semi-solid, petrolatum-like material. Preferably the gelling agent is hydrogenated castor oil, and it is present in an amount ranging from 0.25% – 5.0% by weight of the composition. (In certain formulations according to this invention, a wax may be included in the composition; the wax is one which is selected from the class consisting of (i) synthetic Fischer-Tropsch type waxes having melting points in the range of 71.1° – 115°C.; (ii) paraffin waxes having melting points in the range of 37.8° – 79.4°C; (iii) microcrystalline waxes having melting points in the range of 62.8° – 90.5°C. and (iv) natural waxes selected from the group; Beeswax, Carnauba wax, Chinese insect wax, Myrtle wax and Spermaceti wax; said wax, if a synthetic Fischer-Tropsch type wax, being employed in an amount ranging from about 1% to about 10% by weight of the composition, and if one of the other classes of waxes listed above, being employed in an amount ranging from about 1% to about 15% by weight of said composition.)

The polybutene and polyethylene are blended and are heated, with stirring, to a temperature in the range of 120° –130°C. until the polyethylene is completely dissolved. If a wax is to be included, the mixture is cooled to about 115°C at which point the wax is added, and stirring continued until the wax is dissolved. The mixture is then cooled to about 110°C. and the gelling agent added and thoroughly dispersed in said mixture. Stirring is effected by means of slow speed paddle stirrers, and the stirrers and reaction vessel(s) are of a material, (e.g. stainless steel) which is non-reactive relative to the batch ingredients and which will not deleteriously affect the finished composition. After complete dispersion of the gelling agent, the composition is cooled to 100° – 105°C. and filled off into containers, and then cooled slowly (at 3° – 4°C. per hour) in the containers to ambient temperatures.

31 Claims, No Drawings

TELEPHONE CABLE SPLICE CLOSURE FILLING COMPOSITION

This invention relates to compositions for the filling of splice closures in telecommunications cables, and the like, particularly buried cables which are subject to the ingress of water, or to entry and condensation of water vapor.

The telecommunications cables to which the composition of this invention are applicable are of the type comprising a multiplicity of conductors each having a dielectric of plastic material and a waterproof sheath enclosing the insulated conductors, the interstices of which may be filled with a water-impermeable medium which will not drain under the influence of gravity or such hydrostatic pressure as may arise in the event of damage to the cable sheath but which will permit relative sliding movement of the cellular plastic insulated conductors over one another during such bending of the cable as occur during manufacture and installation of the cable.

Water or water vapor may, and often does, enter a cable through punctures in the cable's outer jacket. These punctures may be the result of lightning strikes, mechanical damage to the cable sheath, or of initial defects incurred during production or laying of the cable. Water or water vapor is also likely to enter the cable at locations where there are splices, unless precautions are taken to prevent the entry of water at the splice closures.

One way which has been utilized heretofore to minimize water ingres is to sheath the cable interior with water and vapor barriers. Such barriers are expensive. Also, such barriers, once they are penetrated, permit the entry of water which flows along the cable through interstices between the cable's conductors, fills the cable, and deteriorates its electrical qualities. Such deterioration manifests itself as an increase in the capacitance between cable conductors and results in increased losses. In telephone communication cables such losses can seriously degrade the operating performance of a telephone system. As will be appreciated, water (with a dielectric constant of 80) in the cable would increase signal losses to such an extent that transmission would virtually cease, or alternatively, the signals would become so garbled as to become meaningless. Ultimately, the water in the cable may corrode the conductors so as to cause open circuits.

It is known to fill the interstices of multi-conductor telephone cables with water blocking compounds in order to inhibit the introduction of water into the cables which are installed in ducts or directly buried in the ground as a result of damage to the cable sheath, and to prevent such water from travelling along the interior of the cable from the point of entry and thus adversely affecting its electrical characteristics along its whole length. Various blocking compounds are known for this purpose, the majority of them being based on jelly-like substances, such as petroleum jelly.

The material used in the compound filling the cable interstices is preferably of such a consistency that when applied to the cable, the compound adheres to the conductors and the sheath well enough to prevent the formation of water passages along the surfaces of the conductors or the inner surfaces of the sheath and also does not significantly reduce the flexibility of the cable. It is also important that the water blocking compound should be sufficiently viscous at the temperature encountered during operation of the cable that in the event of damage to the cable sheath it will not exude from the cable and thus permit the entry of water into the cable. These considerations which apply to cable filling compositions are equally applicable to compounds used for filling cable splice closures.

Various compositions for filling telecommunication cables, to inhibit or prevent the ingress of water, are known. These compositions have also been used for filling of cable splice closures. Examples of such compositions are those comprising mixtures of a mineral oil and microcrystalline wax and/or synthetic hydrocarbon waxes, as described, for instance in Albert King's U.S. Pat. Nos. 2,914,430 and 2,956,036, British Pat. Specifications Nos. 877,895 and 955,348 of Sargent et al, and British Pat. Specification No. 1,293,942 of Tomlinson. These and other known cable filling compositions and splice closure filling compositions are reasonably effective for their intended purpose, but nevertheless have certain drawbacks. More specifically previously known and used telecommunications cables splice closure filling compositions have one or more of the following drawbacks:

a. Low Mechanical strength (internal or cohesive strength).

b. Excessive tackiness.

c. High cost.

d. Low melting points resulting in excessive extrusion from the cable splice at ambient temperatures.

e. Poor compatibility, resulting in components separation.

Cable splice closure filling compositions should have the following characteristics, to ensure satisfactory performance;

1. The composition should have a high melting point, that is, above 80°C.; so that if it is subjected to high ambient temperatures, it will not liquefy and tend to exude from the cable splice.

2. It should be free from moisture and other polar contaminants, which have an adverse effect on the finished splice and cable.

3. It should have a low value for dielectric constant (permittivity) — i.e. not more than 3.

4. It should be stable (i.e. not break down physically) when extruded or pumped into cable splice closures.

Such compositions should also be non-toxic and non-hygroscopic, easy to apply over a wide range of ambient temperatures, and easy to clean off from equipment and personnel.

A prime function of telephone cable splice closure filling compositions is to fill the telephone cable splice in such a way that in the event that damage to the cable occurs at the splice, moisture will not find its way into the cable through the splice.

Another prime function of telephone cable splice closure filling compositions is that such composition be of such a type and consistency that in the event of any kind of damage to the splice, the splice may be opened, the composition removed and work take place, after which the splice would then be resealed with the composition to again form a water barrier. There are known telephone cable splice closure filling compounds which do not have this "re-enterable" characteristic; or, if they do, are of such poor quality in terms of structural (internal cohesive) strength, or are of such low pour point, or are of such an aggressive nature, that they either exude from the splice into the cable or out of the splice completely, or they attack the plastic components within the splice to such an extent that failure occurs at this point.

Materials which have heretofore been used as cable splice closure filling compounds are deficient in one or more of the above-noted characteristics, and there has been a continuing search for improved cable splice closure filling compounds which do not have the deficiencies of known compounds of this type.

An objective of the present invention is to provide cable splice closure filling compositions which are easy to apply over a wide range of ambient temperatures, and which would substantially meet the requirements set out hereinabove.

We have found that the above objective can be met by providing a composition which comprises, in its broadest aspect, a mixture of (1) a low molecular weight liquid polybutene having a viscosity within the range of 200 – 1750 Saybolt Universal seconds (SUS)/98.8°C.*, and a minor proportion, by weight, of a gelling agent which is either (i) hydrogenated castor oil or (ii) finely divided silica. The polybutene is present in this composition in an amount of from 85% to 98% by weight. Polyethylene and a wax may also be included, in minor proportions, in the composition. Said composition is a thixotropic, semi-solid, petrolatum-like material.

In a broad aspect the present invention resides in a composition suitable for use in filling splice closures in telecommunication cables, and the like, comprising from 85% to 98% polybutene, having a viscosity within the range of 200 – 1750 Saybolt Universal seconds (SUS)/98.8°C.*; from about 1% to about 10% of polyethylene, said polyethylene having a molecular weight in the range of 10,000 to 20,000; and from 0.25% to about 6% of a gelling agent selected from the group consisting of hydrogenated castor oil and finely divided silica; said percentages of ingredients being by weight, based on the composition; said composition being a thixotropic, semi-solid, petrolatum-like material.

*As determined by ASTM D2161

Briefly, the telephone cable splice closure filling compositions, of the present invention are designed (a) to fill buried telephone cable splices to prevent the ingress of moisture in the event of splice damage, (b) to have sufficient structural "internal cohesive" strength to resist the effects of working and (c) to ensure that the splice is re-enterable.

The present invention, in a further broad aspect, resides in a process for preparing a composition suitable for filling splice closures in telecommunications cables and the like, which comprises the following steps, in sequence:

a. introducing into a reaction vessel a charge comprising, by weight, based on the final composition 85% – 98% of polybutene having a viscosity within the range of about 200 to about 1750 SUS/98.8°C., and 0% – 10% of polyethylene of molecular weight within the range of 10,000 – 20,000, and heating said charge, with stirring, to a temperature within the range of 110° – 130°C.; (b) adding to said heated charge a minor proportion, e.g. 0.25% – 6% by weight, relative to the total composition of a gelling agent selected from the group consisting of hydrogenated castor oil and finely divided silica, and stirring the mixture while maintaining the aforesaid temperature until the gelling agent is thoroughly dispersed; (c) cooling the resultant product to a temperature in the range of 100° – 105°C.; (d) packaging said product at said temperature of 100° – 105°C. in an appropriate container; and (e) cooling said product in said container at a rate of 3° – 4°C. per hour until ambient temperature is reached. All stirring operations are carried out by means of slow to medium speed paddle stirrers. The reaction vessel (s) and stirrer (s) which are used are made of a material (e.g. stainless steel) which is inert relative to the ingredients of the composition and which will not deleteriously affect the finished composition.

Our telephone cable splice closure filling compositions usually contain polyethylene in an amount of from 1% to 10% by weight of the composition. Thus according to a further aspect of the invention, in step (a) of the above process the mixture of polybutene and polyethylene is heated to a temperature in the range of 120° – 130°C. and maintained at that temperature until the polyethylene is completely dissolved. Then the mixture is cooled to a temperature in the range of 110° – 115°C. and maintained at said temperature while the remaining ingredient or ingredient is added and dispersed in the mixture. The gelling agent is the last ingredient to be added to the mixture.

Preferably the gelling agent is hydrogenated castor oil, and this substance is used in an amount ranging from about 0.25% to about 5.0% by weight of the composition. In the most preferred embodiments of this invention the amount of hydrogenated castor oil employed ranges from about 0.5% to about 3.0% by weight of the composition.

Hydrogenated castor oil is a hard, white synthetic wax which, chemically consists principally of glyceryl tri-12-hydroxystearate. Its molecular weight is about 932. It has a melting point in the range of 85° – 88°C., has a specific gravity of 0.9990 (25°C), an acid value of 2; an iodine value (Wijs) of <5 and a saponification value of 180. It is insoluble in water and in the more common organic solvents. A particularly suitable hydrogenated castor oil for use in our compositions is one commercially obtainable from Emery Industries Limited and known under the trademark "Harfat TP"; however, all similarly produced hydrogenated castor oils such as those known under the trademarks "Castorwax" and "Opalwax," are also suitable for use in the invention.

The polybutene constituent of our composition is a viscous, oily liquid which is prepared by the low temperature polymerization of a refinery gas stream containing polymerizable olefins in the presence of a halide, olefin polymerizing catalyst, or by other methods well known to those skilled in the art. The viscosity of the polybutene may range from about 200 to about 1750 SUS/98.8°C. Preferably, for one type of our compositions, as discussed further hereinafter, we use polybutene having a viscosity within the range of about 350 to about 1750 SUS/98.8°C., and still more preferably, polybutene which has a viscosity within the range of about 500 to about 1500 SUS/98.8°C. For another type of our compositions, as discussed further hereinafter, we use polybutene having a viscosity in the range of about 200 to about 800 SUS/98.8°C. and preferably, in the range of about 250 to about 750 SUS/98.8°C. Mixtures of polybutene may be used, as long as these mixtures have a viscosity within the appropriate range, as mentioned above. Polybutenes which we have found particularly suitable for use in compositions of this invention are those designated by the trademarks "Petrofin 100" and "Petrofin 50." "Petrofin 100" is a polybutene which has a viscosity of about 1,000 SUS/98.8°C., and "Petrofin 50" is a polybutene having a viscosity of 500 SUS/98.8°C.

Polyethylene is included as a constituent in certain of our cable splice closure filling compositions. The polyethylene we use has a molecular weight in the range of about 10,000 to about 20,000, and preferably is in the range of about 10,000 to about 20,000. This material is readily available from a variety of plastics manufacturers. A preferred polyethylene is that which is commercially available from Canadian Industries Limited under the trademark "Alkathene —01500A." It has an average molecular weight of about 19,500.

Our compositions may also include a wax which is selected from:
  i. synthetic Fischer-Tropsch type waxes having melting points in the range of 71.1° – 115°C.
  ii. refined and crude paraffin waxes having melting points in the range of 37.8° – 79.4°C.
  iii. microcrystalline waxes having melting points in the range of 62.8° – 90.5°C.

Certain vegetable and animal waxes can also be used, after suitable treatment, in our compositions in place of one or more of the above categories of waxes, without adversely affecting the physical, chemical and electrical characteristics of the compositions. Suitable vegetable and animal waxes for this purpose are as follows:
  Beeswax (Apis Mellifera)
  Carnauba Wax (Corypha Cerifera)
  Chinese Insect Wax (Coccus Cerifera)
  Japan Wax (Rhus Succedaneum)
  Myrtle Wax (Myrica Cerifera)
  Spermaceti Wax (Physeter Macrocephalus).

The waxes of categories (ii) and (iii) above are of petroleum origin.

Of the above-mentioned animal/vegetable waxes, the most useful are Beeswax, Carnauba wax, Chinese insect wax and Spermaceti wax; however the other waxes listed will produce acceptable end products, after suitable refining, if used within the ranges specified hereinafter for the wax content of our telephone cable splice closure filling compositions.

The synthetic Fischer-tropsch type wax, if present, is employed in an amount ranging from about 1% to about 10% by weight of the composition. If the wax used is chosen from one of the other categories of waxes, namely, paraffin waxes, microcrystalline waxes or refined natural waxes of the types previously mentioned, it is employed in an amount ranging from about 1% to about 15% by weight of the composition.

A synthetic paraffin wax we have found to be particularly useful in formulating our cable splice closure filling compositions is one obtained commercially from Sasol Ltd. of South Africa under the trademark "Paraflint V.I.." Other suitable waxes of this general type, known in the trade as "Fischer-Tropsch" waxes, are available from BASF in Germany or from other sources.

As previously mentioned, the gelling agent may be a finely divided silica, which could also act as a filler in the composition. The finely divided silica, if used, is employed in an amount ranging from 0.25% to about 6% by weight of the composition; preferably the amount of this material used ranges from about 1.0% to about 3.0% by weight of the composition. Various types of finely divided silica may be used, e.g. silica flour, fumed silica, pulverized silica, atomized silica, or micronized silica.

The particle size range of finely divided silica (silica flour) varies very considerably; however, the silica flour used in the compositions of the present invention has a particle size in the range of from 0.007 to 0.050 microns. One type of silica flour we have found very satisfactory for purposes of this invention is that known under the trademark CAB-O-SIL. The following is a description of this particular substance.

CAB-O-SIL is one of the purest silica commercially available. On a dry basis, it is 99% silicon dioxide and is practically free from contaminating metallic oxide. It contains no calcium, sodium or magnesium. CABO-SIL is so pure it meets the requirements of the FDA for use in foods in concentrations up to 2%.

Particles of CAB-O-SIL range in size from 70 to 500 angstroms or 0.007 to 0.50 microns. The physical appearance is that of a fluffy, snow white, super fine powder of extremely low bulk density. CAB-O-SIL particles are finer than those of the finest grades of rubber reinforcing carbon blacks. They are as fine as cigarette smoke.

When thoroughly dispersed and mixed with clear liquids such as mineral oil and turpentine, a transparent product is obtained. When dispersed and mixed with liquids such as alkyd vehicles, polyester resins, doctyl phthalate and other plasticisers and varnishes, a translucent product is produced. The refractive index of 1.46 is close to that of many organic liquids and therefore dispersions are relatively transparent or translucent. For example, a dispersion of CAB-O-SIL in butyl alcohol results in a perfectly clear suspension. CAB-O-SIL is made by a vapour phase process. It is produced by the hydrolysis of silicon tetrachloride at 1100°C. This process produces a colloidal silica of exceptional purity. CAB-O-SIL, because it is produced at a high flame temperature, is generally classified as a "fumed" silica.

From the physical properties and surface characteristics stems the ability of CAB-O-SIL fumed silica to impart thickening and thixotropic control to liquids.

When CAB-O-SIL is dispersed in a liquid system, the chain-like formations join each other and form a network type of structure. This reduces the ability of the liquid to flow and results in increased viscosity or thickening. Upon agitation or shear, the network structure breaks down and reforms after agitation stops. When a gel reverts to a liquid upon agitation and reforms as a gel when agitation stops, the liquid is commonly known as being thixotropic. When very small amounts of CAB-O-SIL are dispersed in a liquid system, there is a limited amount of hydrogen-bonding, because the chains are generally too far apart to bond in a closely knit formation. By increasing the concentration of CAB-O-SIL to a point where there is a sufficient number of CAB-O-SIL chains which have hydrogen-bonded to each other, the desired thickening or thixotropy can be obtained.

A particularly suitable silica flour for the purposes of the present invention is that known under the trademark "CABOSIL M5" which has a particle size of 0.012 microns. Other silica flours which have been found to be satisfactory are those known under the trademarks "Syloid 224", "Syloid 308" "Gasil 23," "Tixosil 38A" "Zeosil 39," and "Cabosil M7."

If desired, in certain instances, modified clays of the attapulgite and/or montmorillonite types, or synthetic silicate powders may be incorporated together with the finely divided silica as an extender in the compositions of the present invention. The use of such a mixture would result in some having saving in cost; however, there would result some decrease in gel structure and strength in the final product. Thus the use of any gelling agent other than hydrogenated castor oil per se or finely divided silica per se is not preferred in the compositions of the present invention.

The compositions of the present invention have the following physical properties:

Melting Point (as measured by ASTM D127) — at least 80°C;

Viscosity (Brookfield)/98.8°C. (as measured by ASTM D2669) within the range of about 125 to about 290 c.p.s. and more particularly, within the range of 210–275 c.p.s.

Extrusion Factor/23.9°C. (as measured by ASTM D2452) -within the range of 1.5 – 5.0 sec/gm. and more particularly within the range of 1.8 to 3.8 sec./gm.;

Unworked Cone Penetration/25°C. (as measured by ASTM D937) within the range of 175–275 units (1/10 mm), and more particularly within the range of 180–260 units (1/10 mm);

Worked Cone Penetration/25°C. (as measured by ASTM D937) -within the range of 300–400 units, and more particularly, within the range of 300 – 350 units;

Dielectric Constant (as measured by ASTM D150) — within the range of 2.1 to 3.0 and more particularly, within the range of 2.1 to 2.8.

Our compositions are also characterized by being thixotropic. The term "thixotropic" is used herein to denote the property of certain materials to thicken and to change rapidly, on standing, from a liquid into a gel-like solid mass or body having sufficient cohesive strength to withstand distortion by gravitational force when suspended freely in an inverted receptable or on a coated object. The gel is also of such a nature that it can be fluidized by the application of mechanical agitation as by shaking, stirring, vibrating, and the like. The property of thixotropy as understood herein is thus characterized by a reversible isothermal sol ⇌ gel transition.

The key to the formulations of our cable splice closure filling compounds is in the choice of polybutene and thixotropic/gelling agent. The polybutene exerts a considerable influence on the end product in terms of viscosity (of the end product) and its resistance to physical breakdown and thus its extrusion capability. The thixotropic/gelling agent, although present in a minor percentage, does, in combination with polyethylene and/or synthetic wax, produce the desired "setting off" and thixotropic/gelation characteristic in the finished compound.

As an optional ingredient there may be included in our compositions up to about 1.0% by weight, based on the composition, of an antioxidant. Any of the well known antioxidants for stabilizing organic substances and materials may be used: for instance, suitable antioxidants for use in the compositions of this invention are those disclosed in British Pat. Specification No. 1,117,771 of Union Carbide Corporation, published June 26, 1968, and in U.S. Pat. No. 3,156,728 of Orloff et al granted Nov. 10 1964, and in the reference "Autoxidation and antioxidants," Lundberg, Interscience Publishers, Inc., New York (1962).

There may also be included in our telephone cable splice closure filling compositions as an additive, if desired, minor amounts of a "tackiness" agent. This could be either a resinous material or something like high molecular weight polyisobutylene.

The telephone cable splice closure filling compositions of the present invention are prepared as follows:

a. The polybutene and polyethylene are introduced into a suitable vessel and thoroughly blended and the mixture is heated, while stirring, to a temperature in the range of 120° – 130°C. This temperature is critical to ensure proper solution of the polyethylene. Slow to medium speed paddle stirring only should be used in manufacturing our compositions. Any paddle stirring device known to those skilled in the art may be used for this purpose, with the proviso that it be made of a material which is inert to the ingredients of the mixture at the temperatures employed and which does not deleteriously affect the finished product, e.g., as to its electrical properties. For instance, the paddle stirrer used may be chosen from one of those described in pages 1204 – 1207 of Perry's "Chemical Engineers' Handbook," 3rd Edition (1950), McGraw-Hill Book Co., N.Y. High speed, high shear stirring would only tend to degrade the product, and therefore should not be employed.

If a wax (as previously described) is to be included in the compositions of this invention, the mixture of polybutene and polyethylene, after complete solution of the latter, is cooled to about 115°C. at which point the wax is added, and the mass is mixed until said wax is completely dissolved.

It is necessary that the mixing vessel and stirrers be made of a material which would be inert relative to the ingredients of the composition at the temperatures employed during preparation of said composition and which would not deleteriously affect the finished product, e.g. as to its electrical properties. A suitable material of construction is stainless steel; however other known materials of construction may be chosen by those skilled in the art, as long as such materials meet the requirements mentioned above. Iron or mild steel vessels and stirrers are unsuitable for making the compositions of this invention, since iron pickup from such vessels and/or stirrers would have a deleterious effect on the electrical properties of the finished composition.

b. After the polyethylene and wax have completely dissolved, the mixture is cooled to about 110°C and the gelling agent, i.e. the hydrogenated castor oil or the silica flour, is added and thoroughly dispersed therein.

A 1,500 lb. batch of product requires about 3 hours to blend and approximately 16 hours to test. The composition is held at the blending temperature throughout the full 19 hours. After corrections (if any are required) the compound is filled off into cartridges or containers at a closely controlled temperature, i.e. 100° – 105°C. This temperature is critical as the starting point of the cooling curve. The rate of coling of the prepared composition is vital to the development of the required properties in the final product, and therefore the rate of cooling is controlled to a rate of 3°–4°C per hour until ambient temperature is reached.

The following examples represent preferred compositions in accordance with the present invention. The percentages given are by weight, relative to the complete composition.

EXAMPLE I

A composition was prepared having the following formulation:

| | |
|---|---|
| Polybutene, having a viscosity of about 1000 SUS/98.8°C. ("Petrofin 100") | 96.10% |
| Synthetic Fischer-Tropsch wax having a melting point in the range of 71.1°C–115°C. ("Paraflint V.I.") | 2.25% |
| Polyethylene, having an average molecular weight of 19,500 ("Alkathene-01500A") | 1.00% |
| Hydrogenated castor oil ("Harfat TP") | 0.65% |

The polybutene and polyethylene are heated to 125°C with stirring until solution of the polyethylene is complete at this temperature. The mixture is cooled to 115°C. at which temperature the synthetic wax component is added and mixed until dissolved. The resultant mixture is further cooled to 110°C., and the hydrogenated castor oil component is then added and dispersed. The above mixing operations are performed in stainless steel vessels to reduce contamination with iron, which could subsequently affect the electrical characteristics of the compound. Stirring throughout is by slow speed, paddle stirrers. High speed high shear stirring is not necessary for this class of compound and in fact would be harmful to the end product.

EXAMPLE II

A second composition was prepared, having a formulation as follows:

| | |
|---|---|
| Polybutene, having a viscosity of about 1000 SUS/98.8°C. ("Petrofin 100") | 95.15% |
| Polyethylene, having an average molecular weight of 19,500 ("Alkathene - 01500 A") | 3.00% |
| Hydrogenated castor oil ("Harfat TP") | 1.85% |

The polybutene and polyethylene are heated to 125°C. and maintained at this temperature with slow speed, paddle stirring until the polyethylene is completely dissolved. The mixture is cooled to 110°C. at which point the hydrogenated castor oil component is added and stirred until dissolved. Here again the product is produced in stainless steel vessels to eliminate iron contamination.

EXAMPLE III

A composition having the following formulation was prepared:

| | |
|---|---|
| Polybutene, having a viscosity of about 500 SUS/210°F. ("Petrofin 50") | 95.00% |
| Polyethylene, having an average molecular weight of 19,500 ("Alkathene - 01500A") | 3.00% |
| Hydrogenated castor oil ("Harfat TP") | 2.00% |

The polybutene and polyethylene are blended and are heated to 125°C with stirring until the polyethylene is completely dissolved. The mixture is then cooled to 110°C at which temperature the hydrogenated castor oil component is added and thoroughly dispersed. All mixing operations are conducted with slow speed, paddle stirring in stainless steel vessels.

As previously indicated in this specification, a vital phase in the manufacturing process is the temperature at which the compound is packaged into either cartridges or other containers and cooled to ambient temperature. The rate of cooling has a profound effect on the physical characteristics of the packaged compound. Telephone cable splice closure filling compounds (including the compositions of the present invention) are usually filled into the cable splice from cartridges in much the same way as a caulking compound is applied to a window to seal that window using either a mechanically operated hand gun or an air operated hand gun. Alternatively, these compounds may be pumped from say 5 or 10 gallon containers at ambient temperatures into the splice in much the same way as grease is dispensed at service stations for the greasing of car joints. The pump used may be a mechanical pump through which the compound passes on its way to the application point or a pump which produces air pressure operating against a plate which in turn applies pressure to the compound forcing it from the container through a pipeline, again to the point of application.

The compositions according to this invention, of the type illustrated by Examples I and II, may be varied by employing polybutene having viscosities ranging from about 350 to about 1750 SUS/98.8°C. and in proportions ranging from about 85% to about 98% by weight of the composition. The polyethylene constituent of Example II may be employed in an amount from about 1% to about 10% by weight of the composition, and its molecular weight range may vary from about 10,000 to about 20,000. The wax constituent of Example I may be a paraffin wax or microcrystalline wax as previously described herein, in place of "PARAFLINT V.I.,"; or alternatively, any other "Fischer-Tropsch" wax having a melting point in the range of 71.1° – 115°C may be used, or one of the previously mentioned natural waxes may be used. The proportions of waxes employed range from about 1–10%, if a Fischer-Tropsch wax is used, or from 1%–15%, if a wax of one of the other types if used. In our compositions of the type illustrated by Example III, polybutenes having viscosities within the range of about 200 to about 800 SUS/98.8°C may be employed, and in proportions ranging from about 85% to about 98% by weight of the composition. The polyethylene constituent of such compositions may be employed in amounts of from about 1% to about 10% by weight of the compositions, and its molecular weight range may vary from about 10,000 to about 20,000. In the compositions corresponding to both the above types, i.e. as illustrated by all of Examples I–III, the hydrogenated castor oil constituent may be employed in an amount ranging from about 0.25% to about 5.0% by weight of the composition.

The compositions of Example I and II are suitable for general usage and are designed to meet a wide range of application and environmental conditions. That of Example II has better low temperature and high temperature characteristics than the product of Example I. The composition of Example III is specifically designed for applications under conditions of low temperature, such as would be encountered in winter.

The compositions of this invention were evaluated for the following characteristics:

a. Melting Point - as measured by ASTM D127. The melting point of these compositions should be 80°C. or higher. This order of melting point is required so that in the event the splice closure is subjected to excessive ambient temperature conditions, the composition will not liquefy and thus migrate from the enclosure. All the compositions according to this invention have melting points as measured by ASTM D 127 above 80°C.

b. Viscosity (Brookfield)/98.8°C. - as measured by ASTM D2669 this should be controlled to within 125–290 c.p.s. so as to give the best compromise between fluidity and resistance to flow. The compositions of this invention have viscosities which fall within the range 175–250 c.p.s.

c. Extrusion Factor 23.9°C. - as measured by ASTM D2452. To be of practical value, a cable splice closure filling composition should have an extrusion factor between 1.5–5.0 secs/gm. If this factor is below 1.5 the compound will be too soft and runny, whereas if said factor is above 5.0 the compound will be too hard to be of practical value. The compositions of this invention have extrusion factors falling within the range 1.8–3.8 secs/gm. The extrusion value is a measure of the physical breakdown of the compound as it is extruded from cartridges into the splice closure or from pumping equipment into the splice closure and is a vitally important characteristic of compositions of this type.

d. Unworked Cone Penetration/25°C - as measured by ASTM D937 - Ideally the unworked cone penetration of cable splice closure compounds should fall within the range 175–275 units (1/10 mm.). The compositions of this invention have values for this characteristic which range from 180–260 units.

e. Worked Cone Penetration/25°C. - as measured by ASTM D937 -To be of practical value, splice closure filling compounds should have worked cone penetration values/25°C. in the range of 300–400 units. If such values are below 300 the compound would be too hard whereas if said values are above 400 the compound would be too soft to be of practical value. The compositions of the present invention have worked cone penetration values which fall within the range 300 – 350 units.

f. Dielectric Constant — as measured by ASTM D150 - Ideally this value should be the same as that for air, which is 1. However in practice the best possible compromise is made which results in values for dielectric constant for cable splice closure filling compounds of up to 3. The compositions of this invention have dielectric constants falling within the range of 2.1–2.8. The following typical test data were obtained for the compositions of Examples I, II and III herein:

Although the present invention has been described herein with reference to certain particular embodiments, it will be apparent to those skilled in the art that variations and modifications in this invention, such as for example, in the ingredients of the compositions, and/or in the proportions of ingredients, and/or in the processing conditions for the manufacture of these compositions, are possible without departing from the broadest aspects of the invention. It is to be understood, then that the present invention is not to be limited to what has been particularly described herein; our intention is that this invention cover all embodiments as may fall within the ambit of the claims which follow.

We claim:

1. A composition suitable for use in filling splice closures in telecommunications cables, and the like, comprising:
   a. from 85% – 98% by weight polybutene, said polybutene being in the form of a viscous, oily liquid having a viscosity within the range of about 200 to about 1750 Saybolt Universal seconds (SUS)/98.8°C; and
   b. from about 0.25% to about 6.0%, by weight, of a gelling agent selected from the group consisting of hydrogenated castor oil and finely divided silica; said composition being a thixotropic, semi-solid, petrolatum-like material having a Brookfield viscosity at 98.8°C. (ASTM D 2669) within the range of about 125 to about 290 c.p.

2. A composition suitable for use in filling splice closures in telecommunications cables, and the like, comprising:
   a. from about 85% to about 98% polybutene, said polybutene being in the form of a viscous oily liquid and having a viscosity within the range of about 200 to about 1750 Saybolt Universal seconds (SUS)/98.8°C.;
   b. from about 1% to about 10% by weight of polyethylene, said polyethylene having a molecular weight in the range of about 10,000 to about 20,000; and
   c. from about 0.25% to about 6% of a gelling agent selected from the group consisting of hydrogenated castor oil and finely divided silica; said percentages of ingredients being by weight, based on the com-

| Test | Composition of Example I | Composition of Example II | Composition of Example III |
|---|---|---|---|
| Viscosity /98.8°C/(ASTM D2669) | 225 cps | 275 cps | 163 cps |
| Drop Point (ASTM D127) | 93°C | 90°C | 86°C |
| Dissipation Factor/100°C/60 Hz | 0.0001 | 0.0003 | 0.0003 |
| DielectricConstant/100°C/ (ASTM D150) | 2.12 | 2.17 | 2.15 |
| Unworked Cone Penetration/25°C (ASTM D937) | 200 | 230 | 260 |
| Extrudability/24°C (ASTM D2452) | 3.2 sec/gram | 3.6 sec/gram | 1.8 sec/gram |
| Extruded Cone Penetration/25°C/ (ASTM D217) | 345 | 325 | 335 |
| Condition at −40°C/(Dussek Test) | Some cracking observed | No visual signs of cracking | No visual signs of cracking |
| Dussek Extrudability Test*/−40°C | 2.9 grams/sec. | 1.5 grams/sec. | 14.3 grams/sec |

*The Dussek Extrudability Test is performed using text cylinders made from nominal 2" I.D. steel tubing with a welded, flat end (¼" plate) centrally bored with a 5/16" diameter opening. The welded end plate of this aperture being the 5/16" diameter opening. The overall unit is approximately 12" in length and is fitted with a screw top through which a ¼" air line is welded. This test piece was devised to eliminate variations which can exist between glassine and/or foil covered cardboard cartridges and has in practice given results with an acceptable degree of reproducibility.

position; said composition being a thixotropic, semi-solid, petrolatumlike material having a Brookfield viscosity at 98.8°C. (ASTM D 2669) within the range of about 125 to about 290 c.p.

3. A composition as in claim 2 wherein the gelling agent is hydrogenated castor oil, said hydrogenated castor oil being present in an amount ranging from about 0.25% to about 5.0% by weight of the composition.

4. A composition as in claim 2 wherein the gelling agent is finely divided silica, and said finely divided silica is employed in an amount ranging from about 0.25% to about 6% by weight of the composition.

5. A composition as in claim 2, and including also a wax selected from the class consisting of:
   i. synthetic Fischer-Tropsch type waxes having melting points in the range of 71.1°C – 115°C,
   ii. paraffin waxes having melting points in the range of 37.8°C. – 79.4°C.
   iii. microcrystalline waxes having melting points in the range of 62.8°–90.5°C.; and
   iv. natural waxes selected from the group: Beeswax, Carnauba wax, Chinese insect wax, Japan wax, Myrtle wax and Spermaceti wax: said wax, if a synthetic Fischer-Tropsch type wax, being employed in an amount ranging from about 1% to about 10% by weight of the composition, and in one of the other classes of waxes listed above, being employed in an amount ranging from about 1% to about 15% by weight of said composition.

6. A composition as in claim 5 wherein the gelling agent is hydrogenated castor oil, said hydrogenated castor oil being present in an amount ranging from about 0.25% to about 5.0% by weight of said composition.

7. A composition according to claim 2, which includes also an antioxidant in an amount of up to about 1.0% by weight of said composition.

8. A composition according to claim 2, having essentially the following formulation:

| | |
|---|---|
| (a) Polybutene, having a viscosity within the range of 350–1750 SUS/98.8°C. | 85%–98% |
| (b) synthetic Fischer Tropsch type wax having a melting point in the range of 71.1°C–115°C | 1%–10% |
| (c) Polyethylene, of molecular weight in the range of about 10,000 to about 20,000 | 1%–10% |
| (d) Hydrogenated castor oil | 0.25%–5.0%, | said percentages of ingredients being by weight, based on the composition.

9. A composition according to claim 2, having essentially the following formulation:

| | |
|---|---|
| (a) Polybutene having a viscosity within the range of 350–1750 SUS/98.8°C. | 85%–98% |
| (b) Paraffin wax having a melting point in the range of 37.8°C. –79.4°C. | 1%–15% |
| (c) Polyethylene, of molecular weight in the range of about 10,000 to about 20,000 | 1%–10% |
| (d) Hydrogenated castor oil | 0.25%–5.0%, | said percentages of ingredients being by weight, based on said composition.

10. A composition according to claim 2, having essentially the following formulation:

| | |
|---|---|
| (a) Polybutene having a viscosity within the range of 350–1750 SUS/98.8°C. | 85%–98% |
| (b) Microcrystalline wax, having a melting point in the range of 62.8°C–90.5°C. | 1%–15% |
| (c) Polyethylene, of molecular weight in the range of about 10,000 to about 20,000 | 1%–10% |
| (d) Hydrogenated castor oil | 0.25%–5.0%, | said percentages of ingredients being by weight, based on the composition.

11. A composition according to claim 2, and having essentially the following formulation:

| | |
|---|---|
| (a) Polybutene, having a viscosity within the range of 350–1750 SUS/98.8°C. | 85%–98% |
| (b) Polyethylene, of molecular weight in the range of about 10,000 –20,000 | 1%–10% |
| (c) Hydrogenated castor oil | 0.25%–5.0%, | said percentages of ingredients being by weight, based on the composition.

12. A composition according to claim 2 and having essentially the following formulation:

| | |
|---|---|
| (a) Polybutene, having a viscosity within the range of 200 –800 SUS/98.8°C. | 85%–98% |
| (b) Polyethylene, of molecular weight in the range of about 10,000 to about 20,000 | 1%–10% |
| (c) Hydrogenated castor oil | 0.25%–5.0%, | said percentages of ingredients being by weight, based on the composition.

13. A composition according to claim 8, which has substantially the following formulation:

| | |
|---|---|
| (a) Polybutene, having a viscosity of about 1,000 SUS/98.8°C. | 96.10% |
| (b) Synthetic Fischer-Tropsch wax having a melting point in the range of 71.1°C–115°C. | 2.25% |
| (c) Polyethylene, having an average molecular weight of 19,500 | 1.00% |
| (d) Hydrogenated castor oil | 0.65%, | said percentages of ingredients being by weight, based on the composition.

14. A composition according to claim 11, which has substantially the following formulation:

| | |
|---|---|
| (a) Polybutene, having a viscosity of about 1,000 SUS/98.8°C. | 95.15% |
| (b) Polyethylene, having an average molecular weight of 19,500 | 3.00% |
| (c) Hydrogenated castor oil | 1.85%, | said percentages of ingredients being by weight, based on the composition.

15. A composition according to claim 12, having substantially the following formulation:

| | |
|---|---|
| (a) Polybutene, having a viscosity of about 500 SUS/98.8°C. | 95.00% |
| (b) Polyethylene, having an average molecular weight of 19,500 | 3.00% |
| (c) Hydrogenated castor oil | 2.00%, | said percentages of ingredients being by weight, based on the composition.

16. A composition according to claim 4 wherein said finely divided silica has an average particle size in the range of 0.007 – 0.05 micron.

17. A composition as set forth in claim 2, and having the following physical characteristics:

Melting point (as measured by ASTM D 127) — greater than 80°C.

Extrusion Factor/23.9°C (as measured by ASTM D 2452) — within the range of 1.8 to 3.8 sec./gm.

Unworked Cone Penetration/25°C (as measured by ASTM D937) — within the range of 180 – 260 units (1/10 mm)

Worked Cone Penetration/25°C (as measured by ASTM D937) — within the range of 300 – 350 units Dielectric Constant (as measured by ASTM D 150) — within the range of 2.1 to 2.8.

18. A composition as defined in claim 1 and having the following characteristics:

Melting Point (as measured by ASTM D 127) — at least 80°C.

Viscosity (Brookfield)/98.8°C. (as measured by ASTM D2669) within the range of about 125 to about 290 cps.

Extrusion Factor/23.9°C. (as measured by ASTM D2452) — within the range of 1.5 – 5.0 sec./gm Unworked Cone Penetration/25°C (as measured by ASTM D937) — within the range of 175 – 275 units (1/10 mm)

Worked Cone Penetration/25°C (as measured by ASTM D937) within the range of 300–400 units Dielectric Constant (as measured by ASTM D150) — within the range of 2.1 to 3.0.

19. A process for preparing a composition suitable for filling splice closures in telecommunications cables and the like, which comprises the following steps, in sequence:

a. introducing into a reaction vessel a charge comprising 85% – 98% by weight polybutene and 0 – 10% by weight polyethylene, said polybutene being in the form of a viscous oily liquid and having a viscosity within the range of about 200 to about 1750 Saybolt Universal seconds (SUS)/98.8°C., and said polyethylene having a molecular weight within the range of 10,000 – 20,000, and heating said charge, with stirring, to a temperature within the range of 110°– 130°C., said percentages being based on the final composition;

b. adding to said heated and stirred charge from about 0.25% to about 6% by weight, relative to the total composition, of a gelling agent selected from the group consisting of hydrogenated castor oil and finely divided silica, and stirring said mixture while maintaining the aforesaid temperature until said gelling agent is thoroughly dispersed; said stirring in steps (a) and (b) being effected by means of slow to medium speed paddle stirrers, and said reaction vessel and said stirrers being made of a material which is inert relative to the ingredients of the composition and which will not deleteriously affect the finished composition;

c. cooling the resultant product to a temperature in the range of 100°– 105°C.;

d. packaging said product at said temperature of 100°– 105°C. in an appropriate container; and e. cooling said product in said container at a rate of 3°–4°C per hour until ambient temperature is reached.

20. A process as set forth in claim 19 wherein, in step (a), said polybutene and said polyethylene are thoroughly blended and the mixture is heated to a temperature in the range of 120°– 130°C, with stirring, until the polyethylene is completely dissolved; said polybutene comprising from 85% to 98% by weight of said composition and said polyethylene comprising from about 1% to about 10% by weight of said composition.

21. A process as in claim 19 wherein said gelling agent is hydrogenated castor oil, and said hydrogenated castor oil is employed in an amount ranging from about 0.25% to about 5.0% by weight of the composition.

22. A process as in claim 19 wherein said gelling agent is finely divided silica, and said finely divided silica is employed in an amount ranging from about 0.25% to about 6% by weight of the composition.

23. A process as defined in claim 20 wherein said composition includes also a wax selected from the class consisting of:

i. synthetic Fischer-Tropsch type waxes having melting points in the range of 71.1° – 110°C., ii. paraffin waxes having melting points in the range of 27.8° – 79.4°C., iii. microcrystalline waxes having melting points in the range of 62.8° – 90.5°C; and iv. natural waxes selected from the group: Beeswax, Carnauba wax, Chinese insect wax, Japan wax, Myrtle wax and Spermaceti wax;

said wax, if a synthetic Fischer-Tropsch type wax, being employed in an amount ranging from about 1% to about 10% by weight of the composition, and if one of the other classes of waxes listed above, being employed in an amount ranging from about 1% to about 15% by weight of said composition, and wherein at the conclusion of step (a) and before the addition of said gelling agent, the homogeneous blend of polybutene and polyethylene is cooled to about 115°C. at which temperature said wax is added, and the mixture is stirred until the wax is dissolved.

24. A process as in claim 23, wherein said wax is a synthetic Fischer-Tropsch type wax having a melting point in the range of 71.1°– 115°C., said wax being employed in an amount ranging from 1% to about 10% by weight of the composition and said gelling agent is hydrogenated castor oil, and is employed in an amount ranging from 0.25% to about 5.0% by weight of the composition.

25. A process as in claim 20 wherein, after complete dissolution of the polyethylene in the polybutene, the blend of polybutene and polyethylene is cooled to about 110°C., at which temperature the gelling agent is added, and the mixture is maintained at a temperature of about 110°C. with constant stirring, until said gelling agent is thoroughly dispersed.

26. A process as in claim 25 wherein the mixing and heating operations are carried out in a stainless steel vessel.

27. A process as in claim 24 wherein said polybutene and said polyethylene are heated, with stirring, to about 125°C. until solution of the polyethylene is complete; the mixture is cooled to about 115°C. and said synthetic Fischer-Tropsch type wax is then added and mixed in until said wax is dissolved; and the resultant mixture is cooled to about 110°C at which temperature hydrogenated castor oil is added and thoroughly dispersed in the mixture, the mixing being effected by means of slow speed paddle stirrers in stainless steel vessels.

28. A process as in claim 27 wherein the ingredients used, and their relative proportions, are essentially as follows:

| | |
|---|---|
| (a) Polybutene, having a viscosity of about 1000 SUS/98.8°C. | 96.10% |
| (b) Synthetic Fischer-Tropsch wax having a melting point in the range of 71.1°C–115°C. | 2.25% |
| (c) Polyethylene, having an average molecular weight of 19,500 | 1.00% |
| (d) Hydrogenated castor oil | 0.65%, | said percentages of ingredients being by weight, based on the composition.

29. A process as in claim 25 wherein said polybutene and said polyethylene are heated with stirring, to about 125°C. until solution of the polyethylene is complete; and the mixture is cooled to about 110°C., at which temperature hydrogenated castor oil is added and the mixture stirred until complete dispersion is obtained; the mixing being effected by means of slow speed paddle stirrers in stainless steel vessels.

30. A process as in claim 29 wherein the ingredients used, and the relative proportions thereof, are essentially as follows:

| | |
|---|---|
| (a) Polybutene, having a viscosity of about 1,000 SUS/98.8°C | 95.15% |
| (b) Polyethylene, having an average molecular weight of 19,500 | 3.00% |
| (c) Hydrogenated castor oil | 1.85%, | said percentages of ingredients being by weight, based on the composition.

31. A process as in claim 29 wherein the ingredients used, and their relative proportions, are essentially as follows:

| | |
|---|---|
| (a) Polybutene, having a viscosity of about 500 SUS/98.8°C. | 95.00% |
| (b) Polyethylene, having an average molecular weight of 19,500 | 3.00% |
| (c) Hydrogenated castor oil | 2.00%, | said percentages of ingredients being by weight, based on the composition.

* * * * *